(12) United States Patent
Chiappetta et al.

(10) Patent No.: US 7,824,470 B2
(45) Date of Patent: Nov. 2, 2010

(54) METHOD FOR ENHANCING MASS TRANSPORT IN FUEL DEOXYGENATION SYSTEMS

(75) Inventors: Louis Chiappetta, South Windsor, CT (US); Louis J. Spadaccini, Manchester, CT (US); He Huang, Glastonbury, CT (US); Mallika Gummalla, Longmeadow, MA (US); Dochul Choi, Lexington, MA (US)

(73) Assignee: United Technologies Corporation, Hartford, CT (US)

( * ) Notice: Subject to any disclaimer, the term of this patent is extended or adjusted under 35 U.S.C. 154(b) by 661 days.

(21) Appl. No.: 11/334,126

(22) Filed: Jan. 18, 2006

(65) Prior Publication Data
US 2007/0163438 A1 Jul. 19, 2007

(51) Int. Cl.
B01D 53/22 (2006.01)

(52) U.S. Cl. .................. 95/54; 95/46; 95/262; 96/6; 96/7; 96/11; 96/215; 96/220; 210/640; 210/490; 366/338

(58) Field of Classification Search .............. 96/4, 96/6, 7, 9, 11, 155, 215, 220; 95/45, 46, 95/54, 241, 262; 210/640, 641, 650, 490; 366/338
See application file for complete search history.

(56) References Cited

U.S. PATENT DOCUMENTS

| 4,341,538 A | * | 7/1982 | Vadnay et al. | .......... 96/6 |
| 4,371,385 A | | 2/1983 | Johnson | |
| 4,516,984 A | | 5/1985 | Warner et al. | |
| 4,525,182 A | * | 6/1985 | Rising et al. | .......... 96/6 |
| 4,602,923 A | | 7/1986 | Bernstein | |
| 4,729,773 A | | 3/1988 | Shirato et al. | |
| 4,955,992 A | | 9/1990 | Goodale et al. | |

(Continued)

FOREIGN PATENT DOCUMENTS

EP 0273267 7/1988

(Continued)

OTHER PUBLICATIONS

U.S. Appl. No. 11/265,845, entitled "Fuel Deoxygenation System With Multi-Layer Oxygen Permeable Membrane", filed Nov. 3, 2005.

(Continued)

*Primary Examiner*—Jason M Greene
(74) *Attorney, Agent, or Firm*—Carlson, Gaskey & Olds PC (57) ABSTRACT

A fuel system for an energy conversion device includes a deoxygenator system with a multitude of flow impingement elements which are interleaved to provide a fuel channel with intricate two-dimensional flow characteristics. The flow impingement elements break up the boundary layers and enhance the transport of oxygen from the core of the of the fuel flow within the fuel channel to the oxygen permeable membrane surfaces by directing the fuel flow in a direction normal to the oxygen permeable membrane. The rapid mixing of the relatively rich oxygen core of the fuel with the relatively oxygen-poor flow near the oxygen permeable membrane enhances the overall removal rate of oxygen from the fuel. Because this process can be accomplished in fuel channels of relatively larger flow areas while maintaining laminar flow, the pressure drop sustained is relatively low.

14 Claims, 9 Drawing Sheets

U.S. PATENT DOCUMENTS

| | | |
|---|---|---|
| 5,053,060 A | 10/1991 | Kopf-Sill et al. |
| 5,078,755 A | 1/1992 | Tozawa et al. |
| 5,123,937 A | 6/1992 | Shibata et al. |
| 5,154,832 A | 10/1992 | Yamamura et al. |
| 5,340,384 A | 8/1994 | Sims |
| 5,410,052 A | 4/1995 | Smith et al. |
| 5,482,860 A | 1/1996 | Copeland et al. |
| 5,522,917 A | 6/1996 | Honda et al. |
| 5,693,122 A | 12/1997 | Berndt |
| 5,695,545 A | 12/1997 | Cho et al. |
| 5,827,429 A * | 10/1998 | Ruschke et al. ............ 96/6 |
| 5,888,275 A | 3/1999 | Hamasaki et al. |
| 5,902,382 A | 5/1999 | Campain et al. |
| 5,902,747 A | 5/1999 | Nemser et al. |
| 6,106,591 A | 8/2000 | Keskar et al. |
| 6,168,648 B1 | 1/2001 | Ootani et al. |
| 6,258,154 B1 | 7/2001 | Berndt et al. |
| 6,309,444 B1 | 10/2001 | Sims et al. |
| 6,315,815 B1 | 11/2001 | Spadaccini et al. |
| 6,379,796 B1 | 4/2002 | Uenishi et al. |
| 6,402,810 B1 | 6/2002 | Mayer et al. |
| 6,402,818 B1 | 6/2002 | Sengupta |
| 6,494,938 B2 | 12/2002 | Sims et al. |
| 6,523,572 B1 * | 2/2003 | Levin et al. ............ 366/338 |
| 6,616,841 B2 | 9/2003 | Cho et al. |
| 6,623,637 B1 | 9/2003 | Monzen et al. |
| 6,682,016 B1 | 1/2004 | Peroulakis |
| 6,709,492 B1 * | 3/2004 | Spadaccini et al. ........... 96/6 |
| 6,811,592 B2 * | 11/2004 | Young et al. ............ 95/248 |
| 7,140,495 B2 * | 11/2006 | Hester et al. ............ 95/46 |
| 7,393,388 B2 * | 7/2008 | Spadaccini et al. ........... 96/6 |
| 2001/0035093 A1 | 11/2001 | Yokota |
| 2002/0195385 A1 | 12/2002 | Cho et al. |
| 2003/0116015 A1 | 6/2003 | Sengupta et al. |
| 2003/0148164 A1 | 8/2003 | Koch et al. |
| 2003/0151156 A1 | 8/2003 | Crumm et al. |
| 2003/0161785 A1 | 8/2003 | Dieckmann |
| 2003/0219637 A1 | 11/2003 | Coors |
| 2004/0025696 A1 | 2/2004 | Varrin, Jr. et al. |
| 2004/0028988 A1 | 2/2004 | Bunker |
| 2004/0050786 A1 | 3/2004 | Dey et al. |
| 2004/0094463 A1 | 5/2004 | Laverdiere et al. |
| 2004/0194627 A1 * | 10/2004 | Huang et al. ............ 96/6 |

FOREIGN PATENT DOCUMENTS

| | | |
|---|---|---|
| EP | 0354797 | 2/1990 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0963229 | 8/1998 |
| EP | 09070738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| JP | 63151307 | 6/1988 |
| JP | 3169304 | 7/1991 |
| JP | 3193106 | 8/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | WO 94/16800 | 8/1994 |
| WO | WO 97/02190 | 1/1997 |
| WO | WO 99/39811 | 8/1999 |
| WO | WO 00/44479 | 8/2000 |
| WO | WO 00/44482 | 8/2000 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |
| WO | 2005025718 | 3/2005 |

OTHER PUBLICATIONS

U.S. Appl. No. 11/334,590, entitled "Fuel Deoxygenation System With Non-Metallic Fuel Plate Assembly", filed Jan. 18, 2006.

U.S. Appl. No. 11/148,508, entitled "Fuel Deoxygenation System With Non-Planar Plate Members, filed Jun. 9, 2005.

U.S. Appl. No. 11/049,175, entitled "Fuel Deoxygenation System With Textured Oxygen Permeable Membrane," filed Feb. 2, 2005.

U.S. Appl. No. 11/334,587, entitled "Fuel Deoxygenator With Non-Planar Fuel Channel and Oxygen Permeable Membrane," filed Jan. 18, 2006.

Richard W. Baker, "Membrane Technology and Applications," 2nd Edition, John Wiley & Sons, Ltd., pp. 96-103.

* cited by examiner

METHOD FOR ENHANCING MASS TRANSPORT IN FUEL DEOXYGENATION SYSTEMS

BACKGROUND OF THE INVENTION

The present invention relates to liquid degassing, and more particularly to a multitude of flow impingement elements which are interleaved to provide a fuel channel with intricate two-dimensional flow characteristics that enhance mixing and oxygen transport.

Jet fuel is often utilized in aircraft as a coolant for various aircraft systems. The presence of dissolved oxygen in hydrocarbon jet fuels may be objectionable because the oxygen supports oxidation reactions that yield undesirable by-products. Solution of air in jet fuel results in an approximately 70 ppm oxygen concentration at the equilibrium saturation condition. When aerated fuel is heated between approximately 300° F. and 850° F. the dissolved oxygen initiates free radical reactions of the fuel resulting in deposits commonly referred to as "coke" or "coking." Coke may be detrimental to the fuel system and may inhibit combustion. The formation of such deposits may impair the normal functioning of a fuel system, either with respect to an intended heat exchange function or the efficient injection of fuel.

Various systems are currently available for liquid deoxygenation. However, none are capable of processing high flow rates characteristic of aircraft engines in a compact and lightweight assembly, and lowering dissolved oxygen concentration sufficiently to suppress coke formation. Typically, lowering the oxygen concentration to approximately 5 ppm is sufficient to overcome the coking problem and allows the fuel to be heated to approximately 650° F. during heat exchange, for example. Moreover, it is often desirable to further reduce the oxygen concentration to allow heating of the fuel to even higher temperatures.

One Fuel Stabilization Unit (FSU) intended for use in aircraft removes oxygen from jet fuel by producing an oxygen partial pressure gradient across a membrane permeable to oxygen. The FSU includes a plurality of flow plates sandwiched between permeable membranes and porous substrate plates within a housing. Each flow plate defines a portion of the fuel passage and the porous plate backed permeable membranes define the remaining portions of the fuel passages.

The planar flow plates utilize flow impingement elements to enhance contact between fuel flow and the oxygen permeable membrane to increase mass transport of dissolved oxygen. Design of the flow impingement elements poses relatively complicated fluid dynamic issues as the flow impingement elements need to enhance contact between fuel flow and the oxygen permeable membrane yet minimize the effect on fuel flow pressure passing therethrough. Furthermore, the flow impingement elements must not unduly increase the fuel flow path length which may result in a significant increase in the size and weight of the FSU system.

Accordingly, it is desirable to provide for the deoxygenation of hydrocarbon fuel in a size and weight efficient system that increases deoxygenation while minimizing fuel flow pressure drop.

SUMMARY OF THE INVENTION

A fuel system for an energy conversion device according to the present invention includes a deoxygenator system with a multitude of flow impingement elements which are interleaved to provide a fuel channel defined by a pair of flow plates with an intricate two-dimensional flow characteristic.

The flow impingement elements enhance contact between fuel flow and an oxygen permeable membrane to increase mass transport of dissolved oxygen. The flow impingement elements break up the boundary layer of the fuel flow to enhance the transport of oxygen from the core of the fuel flow to the oxygen permeable membrane surface. The rapid mixing of the relatively rich oxygen core of the fuel with the relatively oxygen-poor flow near the oxygen permeable membrane enhances the overall removal rate of oxygen from the fuel. Because this process can be accomplished in fuel channels of relatively larger flow areas while maintaining laminar flow, the pressure drop sustained thereby is relatively low.

The present invention therefore provides for the deoxygenation of hydrocarbon fuel in a size and weight efficient system that increases deoxygenation while minimizing fuel flow pressure drop.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
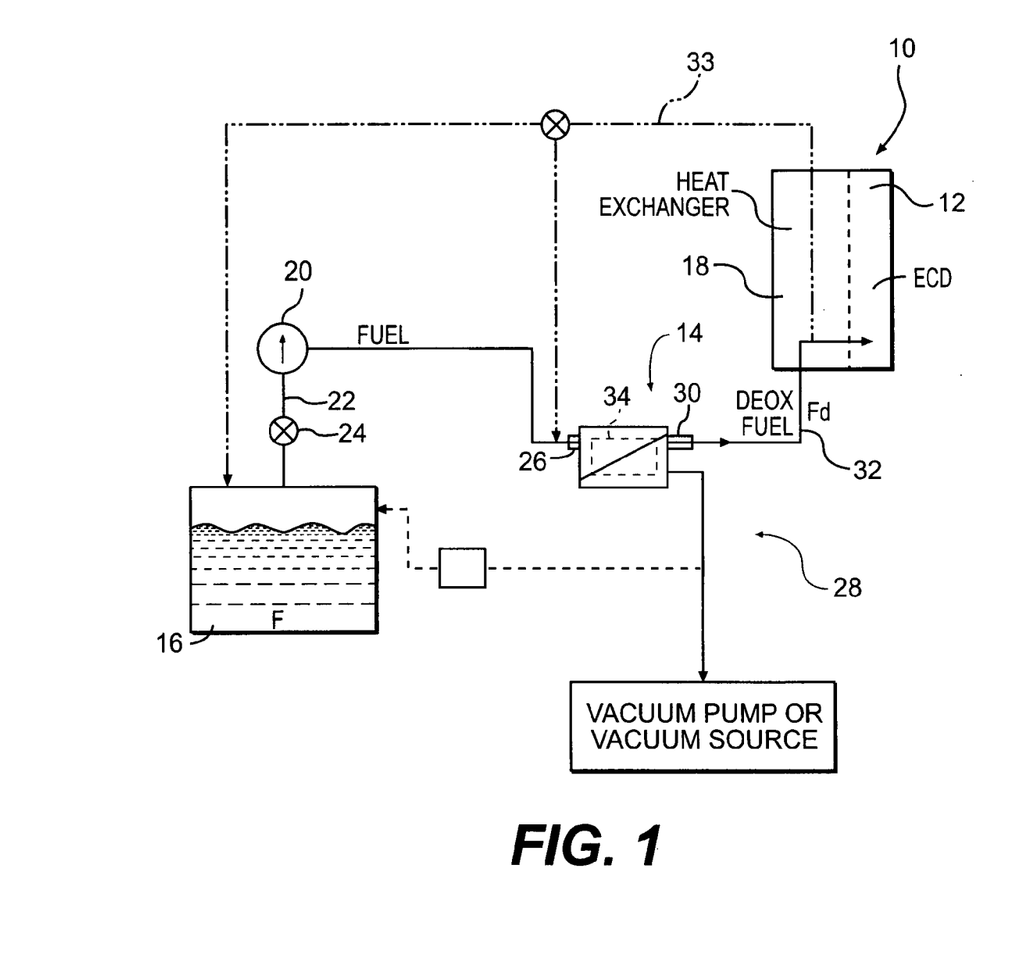
FIG. 1 is a general schematic block diagram of an energy conversion device (ECD) and an associated fuel system employing a fuel deoxygenator in accordance with the present invention.

FIG. 1 illustrates a general schematic view of a fuel system 10 for an energy conversion device (ECD) 12. A deoxygenator system 14 receives liquid fuel F from a reservoir 16 such as a fuel tank. The fuel F is typically a liquid hydrocarbon such as jet fuel. The ECD 12 may exist in a variety of forms in which the liquid hydrocarbon, at some point prior to eventual use as a lubricant, or for processing, for combustion, or for some form of energy release, acquires sufficient heat to support autoxidation reactions and coking if dissolved oxygen is present to any significant extent in the liquid hydrocarbon.

One form of the ECD 12 is a gas turbine engine, and particularly such engines in aircraft. Typically, the fuel also serves as a coolant for one or more sub-systems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchanges distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a vacuum or sweep-gas system 28. The sweep gas may be any gas that is essentially free of oxygen.

The deoxygenated fuel Fd flows from a fuel outlet 30 of the deoxygenation system 14 via a deoxygenated fuel conduit 32, to the heat exchange system 18 and to the ECD 12 such as the fuel injectors of a gas turbine engine. A portion of the deoxygenated fuel may be recirculated, as represented by recirculation conduit 33 to either the deoxygenation system 14 and/or the reservoir 16. It should be understood that although a particular component arrangement is disclosed in the illustrated embodiment, other arrangements will benefit from the instant invention.

Figure 2A:
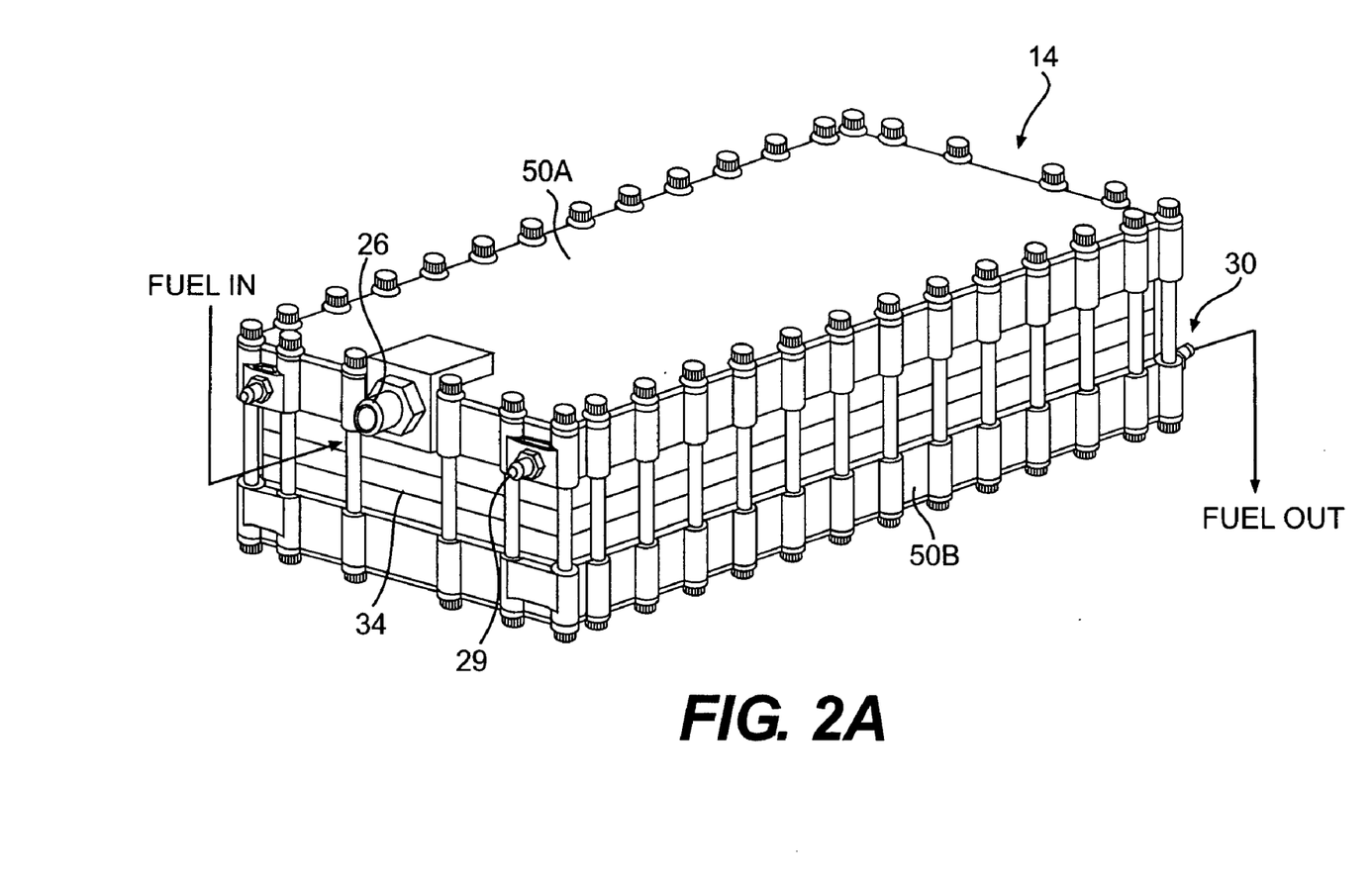
FIG. 2A is an expanded perspective view of a deoxygenator system.
Figure 2B:
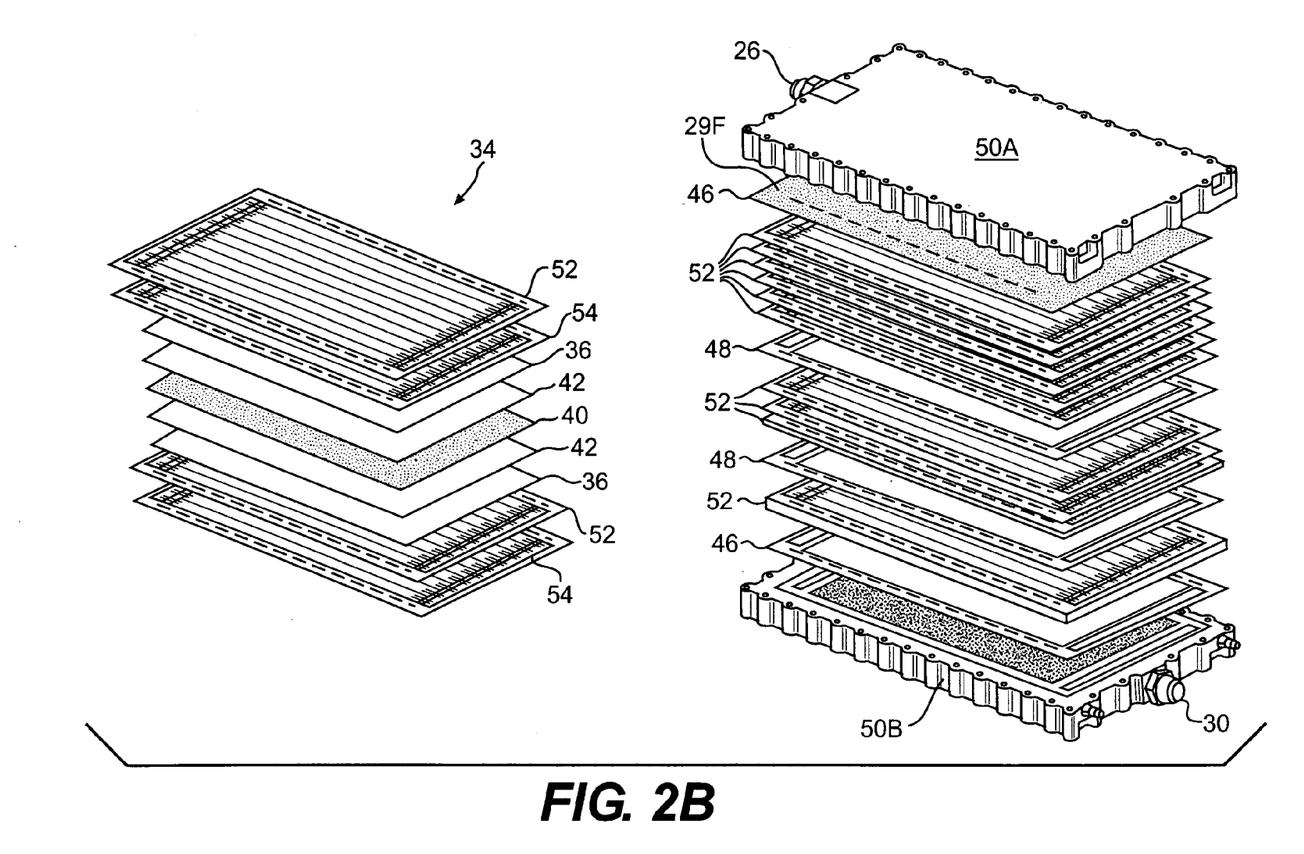
FIG. 2B is an exploded view of a deoxygenator system.
Figure 3:
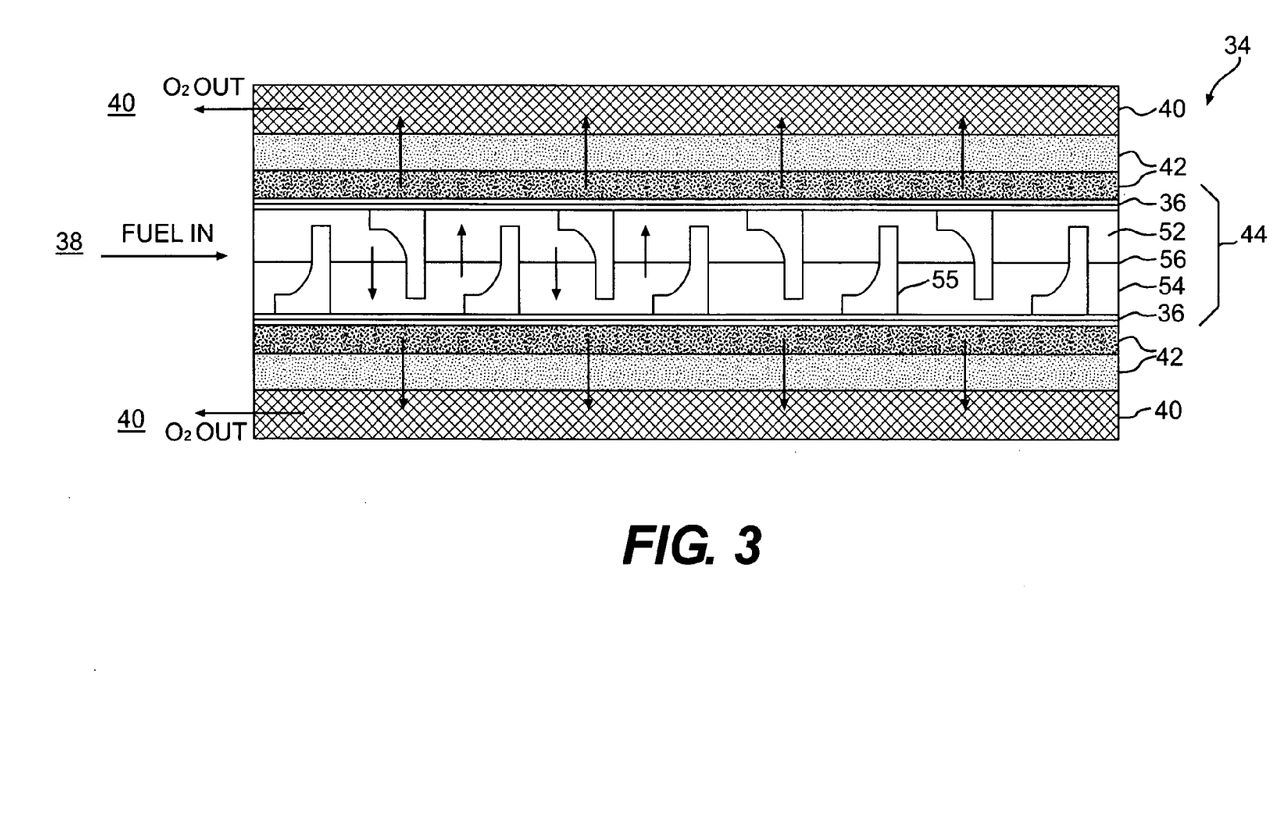
FIG. 3 is an expanded sectional view of a flow plate assembly illustrating a fuel channel and an oxygen-receiving vacuum or sweep gas channel.

Referring to FIG. 2A, the deoxygenator system 14 preferably includes a multiplicity of gas/fuel flow-channel assemblies 34 (FIG. 2B). The assemblies 34 include a oxygen permeable membrane 36 between a fuel channel 38 and an oxygen receiving vacuum or sweep-gas channel 40 which can be formed by a supporting mesh which permits the flow of nitrogen and/or another oxygen-free gas (FIG. 3). It should be understood that the channels may be of various shapes and arrangements to provide an oxygen partial pressure differential, which maintains an oxygen concentration differential across the membrane to deoxygenate the fuel.

The oxygen permeable membrane 36 allows dissolved oxygen (and other gases) to diffuse through angstrom-size voids but excludes the larger fuel molecules. Alternatively, or in conjunction with the voids, the permeable membrane 36 utilizes a solution-diffusion mechanism to dissolve and diffuse oxygen (and/or other gases) through the membrane while excluding the fuel. The family of Teflon AF which is an amorphous copolymer of perfluoro-2,2-dimethyl-1,3-dioxole (PDD) often identified under the trademark "Teflon AF" registered to E. I. DuPont de Nemours of Wilmington, Del., USA, and the family of Hyflon AD which is a copolymer of 2,2,4-trifluoro-5-trifluoromethoxy-1,3-dioxole (TDD) registered to Solvay Solexis, Milan, Italy have proven to provide effective results for fuel deoxygenation.

Fuel flowing through the fuel channel 38 is in contact with the oxygen permeable membrane 36. Vacuum creates an oxygen partial pressure differential between the inner walls of the fuel channel 38 and the oxygen permeable membrane 36 which causes diffusion of oxygen dissolved within the fuel to migrate through the porous support 42 which supports the membrane 36 and out of the deoxygenator system 14 through the oxygen receiving channel 40 separate from the fuel channel 38. For further understanding of other aspects of one membrane based fuel deoxygenator system and associated components thereof, attention is directed to U.S. Pat. No. 6,315,815 entitled MEMBRANE BASED FUEL DEOXYGENATOR and U.S. Pat. No. 6,709,492 entitled PLANAR MEMBRANE DEOXYGENATOR which are assigned to the assignee of the instant invention and which are hereby incorporated herein in their entirety.

Referring to FIG. 2B, one set of plates, which forms one flow-channel assembly 34 of the deoxygenator system 14, includes a flow plate assembly 44 sandwiched adjacent to the oxygen permeable membranes 36 which are supported by a porous support 42 such as non-woven polyester sheet (also illustrated in FIG. 3). It should be understood that the porous substrate, although schematically illustrated, may take various forms. Adjacent one or more assembly 34 is a separator plate 48. The separator plate 48 prevents fuel from leaking across the predefined fuel passages defined by the flow plate assemblies 34. The deoxygenation system 14, irrespective of the number of flow-channel assemblies 34, is sealed by an interface plate 46 and an outer housing plate 50a, 50b, which respectively include the fuel inlet 26, the vacuum port 29, and the fuel outlet 30 (also illustrated in FIG. 2A).

The outer housing plates 50a, 50b are preferably attached together through a multitude of fasteners such as bolts or the like such that the flow-channel assemblies 34 are sandwiched therebetween. The outer housing plates 50a, 50b are preferably relatively rigid components which compress the flow-channel assemblies 34 such that sealing between plates is maintained thereby. Although illustrated as rectilinear in the illustrated embodiment, one of ordinary skill in the art will recognize that alternative shapes, sizes, or configurations including non-rigid housings are suitable and within the scope of the invention.

Each flow plate assembly 44 defines a portion of the fuel channel 38 between the inlet 26 and outlet 30. The vacuum port 29 (FIG. 2A) is in communication with the interface plate 46 and the porous support 42 through vacuum ports 29 in the flow plates 52, 54. Vacuum creates a partial pressure gradient within each of the porous supports 42 to extract dissolved oxygen from the fuel channel 38 through the oxygen permeable membrane 36. The oxygen is then expelled through the vacuum port 29.

The specific quantity of flow-channel assemblies 34 are determined by application-specific requirements, such as fuel type, fuel temperature, and mass flow demand from the engine. Further, different fuels containing differing amounts of dissolved oxygen may require differing amounts of deoxygenation to remove a desired amount of dissolved oxygen.

Each flow plate assembly 44 defines one fuel channel 38 (FIG. 3) between the inlet 26 and outlet 30 (FIG. 2A). Preferably a multitude of parallel flow channels 38 are defined between the inlet 26 and outlet 30 by a multitude of the flow-channel assemblies 34 within the deoxygenator system 14. The configuration of each fuel channel 38 is preferably defined to maximize fuel exposure to the oxygen permeable membrane 36 in order to maximize the amount of dissolved oxygen removed from the fuel. The fuel channels 38 are preferably small enough that fuel is in contact with the oxygen permeable membrane 36 but also large enough so as to not restrict fuel flow.

Each flow plate assembly 44 includes a first flow plate 52, a second flow plate 54, and a flow plate gasket or seal 56 therebetween. It should be understood that the flow plate assembly 44 disclosed in the illustrative embodiment illustrates only two flow plates and a gasket for the sake of clarity, it should be understood that any number of plate assemblies may be located between the outer housing plates 50a, 50b.

The first flow plate 52 and the second flow plate 54 are preferably manufactured of a non-metallic material such as a thermoplastic, for instance polyphenylene sulfide (PPS). It should be understood that other plastics that are compatible with fuel and are electrically conductive (to prevent static charge buildup) may alternatively be utilized as well as materials which are machined rather than molded.

Figure 2C:
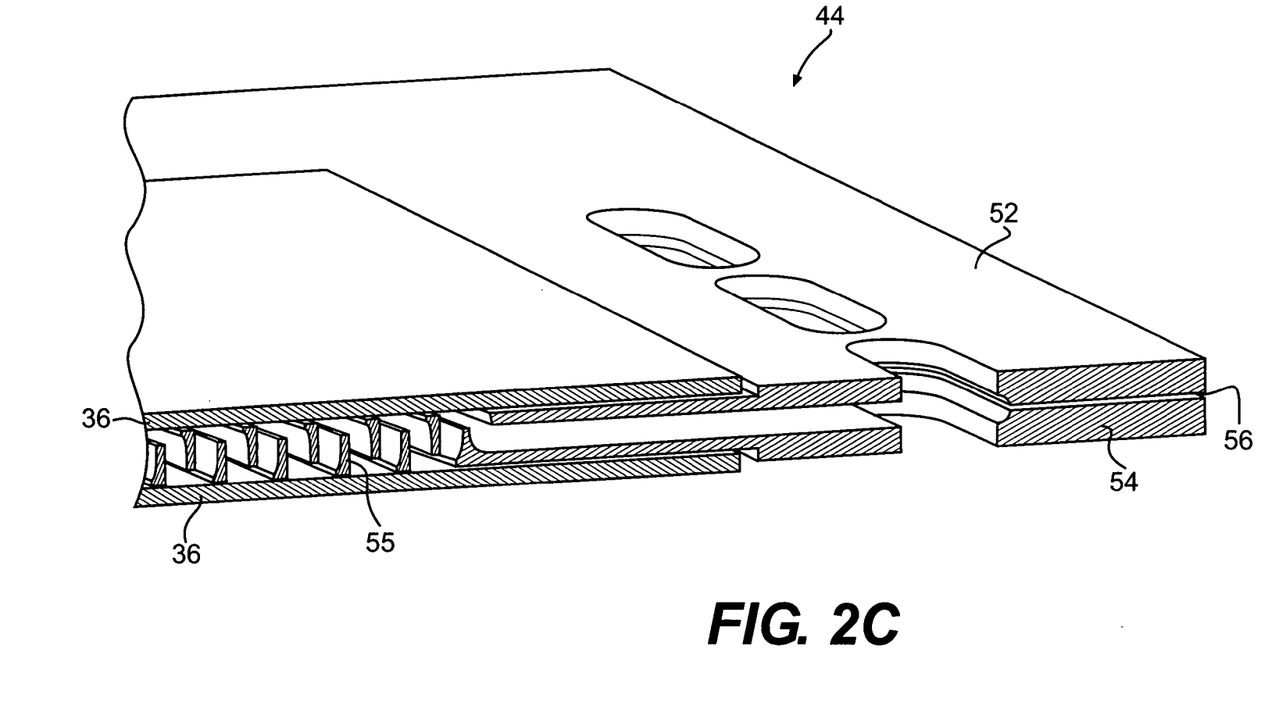
FIG. 2C is an expanded perspective view of a flow plate assembly of the deoxygenator system of FIG. 2B.
Figure 4:
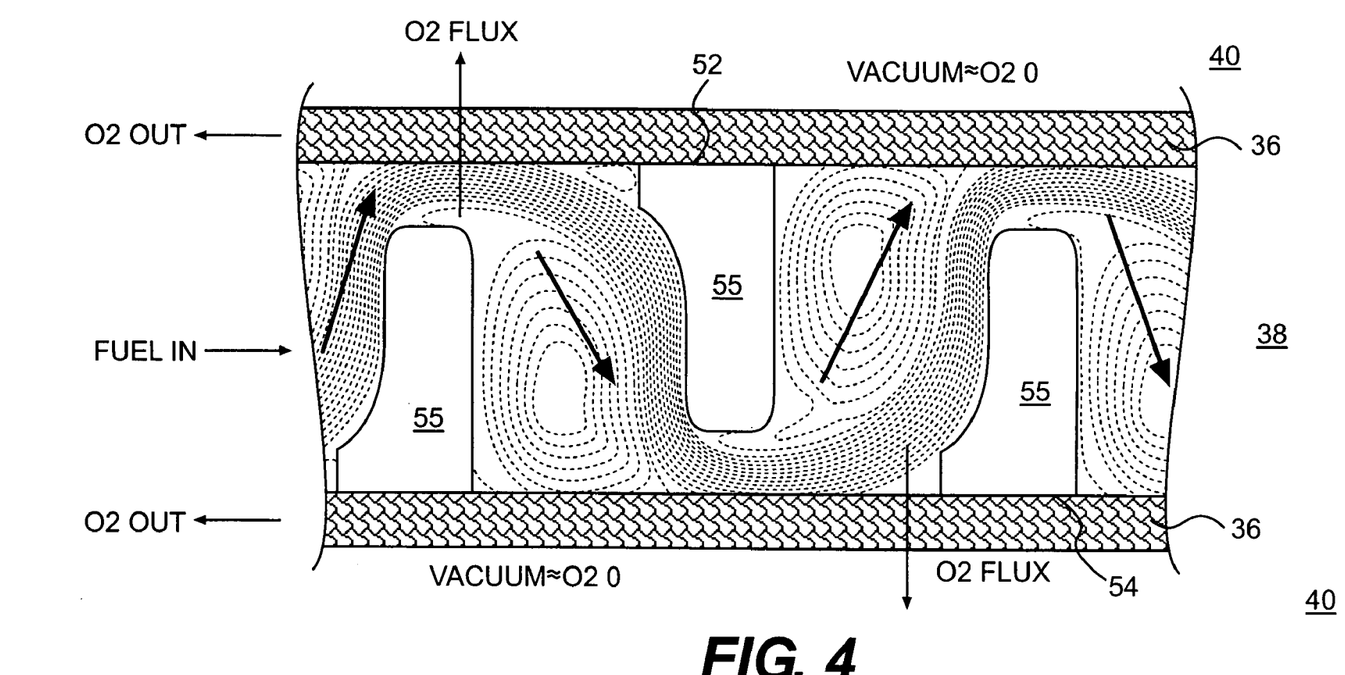
FIG. 4 is an expanded sectional view of a flow plate assembly illustrating a fuel channel and streamlines generated by flow impingement elements of the present invention.

The first flow plate 52 and the second flow plate 54 include flow impingement elements 55 (FIGS. 2C and 3) which increase oxygen transport. When the flow plates 52, 54 are assembled together, the flow impingement elements 55 are interleaved and alternate to provide the fuel channel 38 defined by the flow plates 52, 54 with an intricate two-dimensional flow characteristic (FIG. 4). In other words, the flow impingement elements 55 on each flow plate 52, 54 extend above the planar surface of their respective flow plates 52, 54. When the flow plates 52, 54 are assembled together with the gasket 56 to form the flow plate assembly 44, the flow impingement elements 55 form a complete fuel channel 38 in which the flow impingement elements 55 from adjacent flow plates 52, 54 extend (FIG. 3).

The flow impingement elements 55 enhance transport of oxygen from the bulk flow to the membrane surface, while the non-metallic material minimizes weight and sharp edges which may otherwise damage the oxygen permeable membranes 36. The flow impingement elements 55 of the deoxygenator system 14 enhance contact between fuel flow and the composite oxygen permeable membrane 36 to increase mass transport of dissolved oxygen.

Fuel flowing through the fuel channel 38 is in contact with the composite oxygen permeable membrane 36. Vacuum creates an oxygen partial pressure differential between the inner walls of the fuel channel 38 and the composite oxygen permeable membrane 36 which causes diffusion of oxygen dissolved within the fuel to migrate through the porous support 42 which supports the membrane 36 and out of the deoxygenator system 14 through the oxygen receiving channel 40 separate from the fuel channel 38. For further understanding of other aspects of one membrane based fuel deoxygenator system and associated components thereof, attention is directed to U.S. Pat. No. 6,315,815 entitled MEMBRANE BASED FUEL DEOXYGENATOR; U.S. Pat. No. 6,939,392 entitled SYSTEM AND METHOD FOR THERMAL MANAGEMENT and U.S. Pat. No. 6,709,492 entitled PLANAR MEMBRANE DEOXYGENATOR which are assigned to the assignee of the instant invention and which are hereby incorporated herein in their entirety.

The flow impingement elements 55 enhance deoxygenation by directly impinging the fuel flow onto the oxygen permeable membrane 36 generally in a direction normal to the surface thereof (FIG. 4). The flow impingement elements 55 of the deoxygenator system 14 enhance contact between fuel flow and the oxygen permeable membrane 36 to increase mass transport of dissolved oxygen. The rapid mixing of the relatively rich oxygen core of the fuel with the relatively oxygen-poor flow near the oxygen permeable membrane 36 enhances the overall removal rate of oxygen from the fuel flow. Because this process can be accomplished in fuel channels of relatively larger flow areas while maintaining laminar flow the pressure drop sustained is relatively low.

Figure 5A:
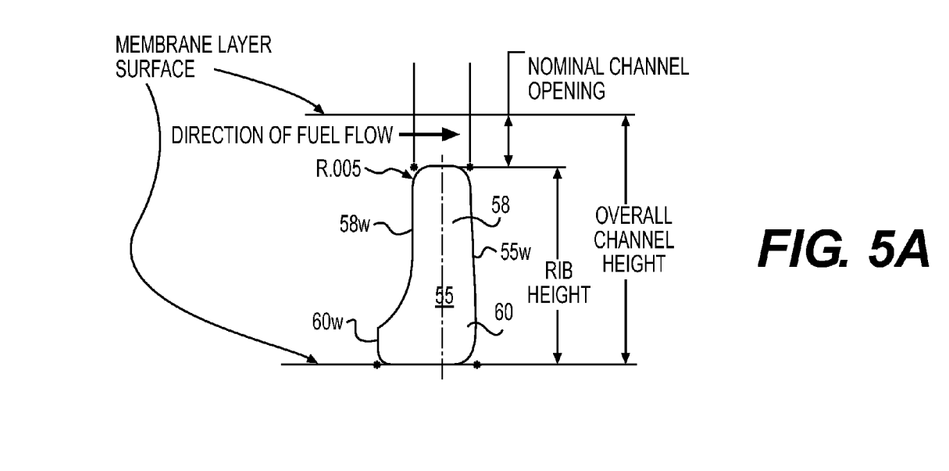
FIG. 5A is an expanded sectional view of a single flow impingement element of the present invention.

Referring to FIG. 5A, each of the flow impingement elements 55 define a base segment 60 adjacent the oxygen permeable membrane 36 and a tip segment 58 opposite thereto. The base segment 60 preferably defines a base thickness between a base wall surface 58W perpendicular to the membrane surface and back wall 55W which is greater than a tip thickness defined by the tip segment 58 between a tip wall surface 60W perpendicular to the membrane surface and the back wall 55W such that a leading face—that which faces into the fuel flow—of each flow impingement element 55 defines a step shape. That is, the downstream side of the flow impingement elements 55 is relatively straight such that the flow is turned abruptly in the direction normal to the membrane surface. This step shape of the flow impingement elements 55, located nearest to the membrane-covered surfaces, are generally a result of an injection molding formation process. Generally, in order to mold the flow impingement elements 55 yet maintain the ability to remove the flow plates 52, 54 from the mold, it is necessary for the ribs to have the relatively thicker section at the base (the region nearest to the membrane) and to taper thereafter. Generally, thicker ribs reduce performance (oxygen removal rate) and the base segments or "feet", reduce oxygen removal performance but have the benefit of also reducing pressure drop. Generally, the shape of the flow impingement elements 55 is determined by fabrication requirements to a large extent but the thickness away from the base is determined by performance requirements. Everything else being equal, straight ribs without "feet" are preferred.

Figure 6A:
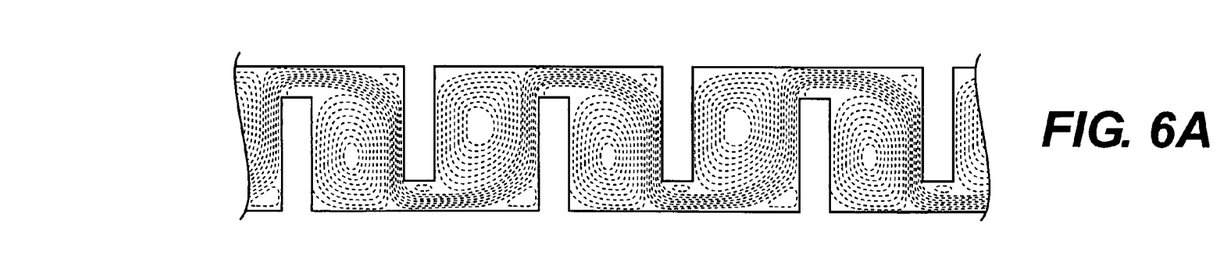
FIG. 6A is an expanded sectional view of a fuel channel and another type of flow impingement elements therein.
Figure 6B:
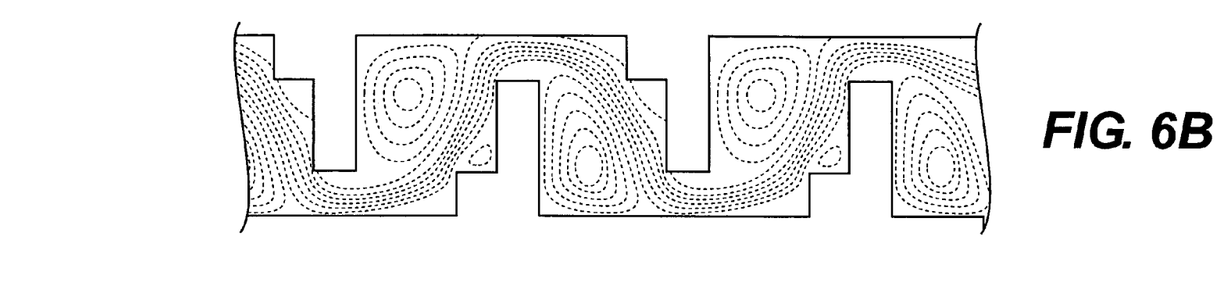
FIG. 6B is an expanded sectional view of a fuel channel and another type of flow impingement elements therein.
Figure 6C:
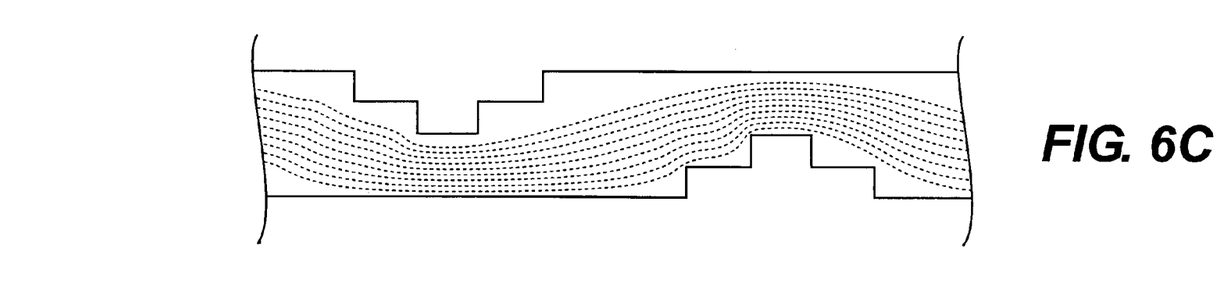
FIG. 6C is an expanded sectional view of a fuel channel and another type of flow impingement elements therein.

It should be understood that alternative shapes such as straight linear shapes (FIG. 6A), linear step shapes (FIG. 6B), step-up step-down triangular shapes (FIG. 6C) may also be utilized with the present invention. It should be generally understood that relatively thick flow impingement elements are poorer performers in terms of oxygen removal (more membrane surface is covered) and higher pressure loss (the flow is "squeezed" between narrower gaps).

Figure 5B:
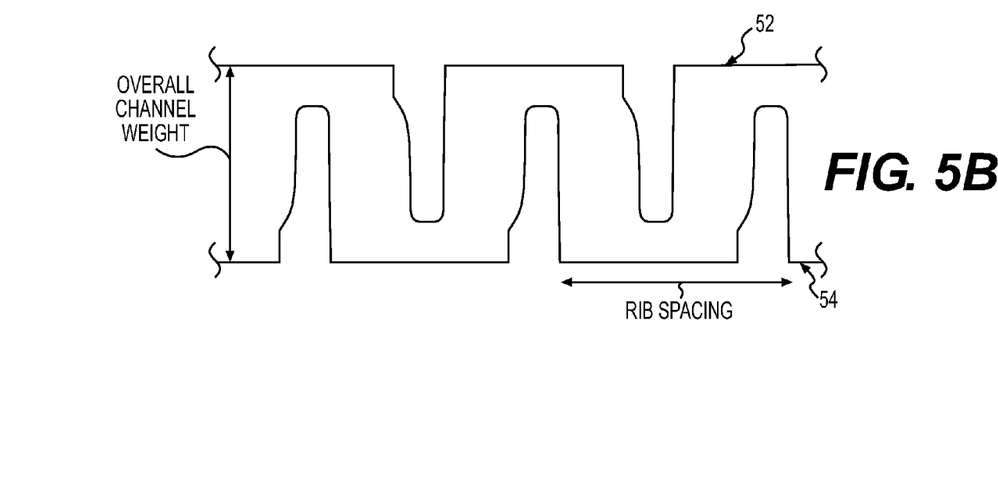
FIG. 5B is an expanded sectional view of a fuel channel and the flow impingement elements therein.

Most preferably, the upstream side of the flow impingement elements 55 between the base segment 60 and the tip segment 58 is radiused to facilitate manufacturing by injection molding (FIG. 4). The base thickness is preferably approximately 0.027 inches and the tip thickness is preferably approximately 0.015 inches for a fuel channel height of approximately 0.068 inches (FIG. 5B).

The overall height of the flow impingement element 55 is preferably greater than 0.5H where H is the height of the fuel channel. Most preferably, the flow impingement elements 55 are each of approximately 0.75H such that each flow impingement element 55 defines a relatively small nominal channel opening between the distal end of the tip segment 58 and the oxygen permeable membrane 36.

In a preferred embodiment, each flow impingement element 55 is separated from the next flow impingement element 55 by a spacing of approximately 0.125 inches. Notably, as the flow impingement element 55 extends deeply into the fuel channel 38, the flow impingement elements 55 alternate such that the flow impingement elements 55 from the first flow plate 52 are interleaved with the flow impingement elements 55 from the second adjacent flow plate 54 (FIG. 5B).

Figure 7:
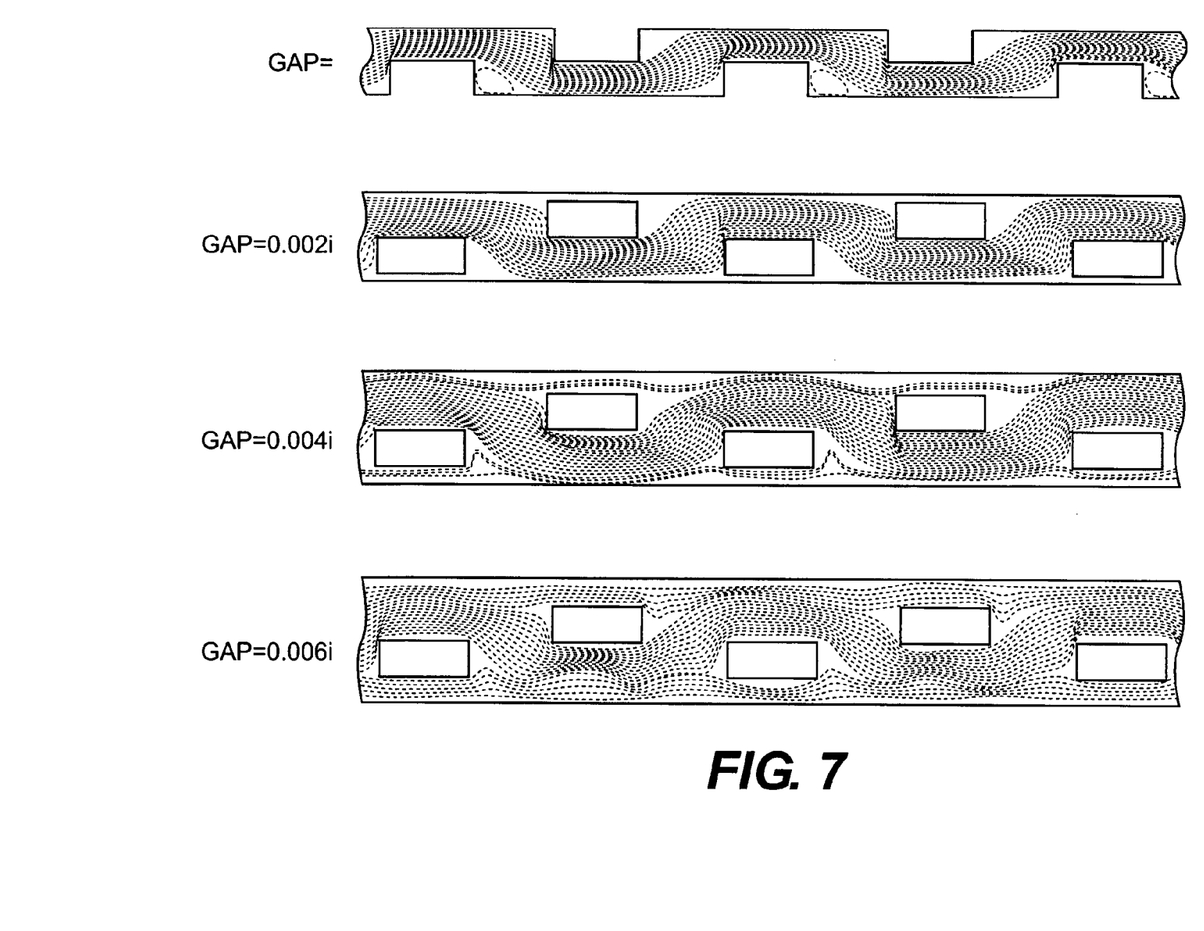
FIG. 7 is an expanded sectional view of a fuel channel having the flow impingement elements displaced from an oxygen permeable membrane by a gap.

The flow impingement elements 55 are preferably located directly adjacent the oxygen permeable membrane 36. That is, no gap exists between the base segment 60 and the membrane 36. Various gap spacing and fuel streamlines therefore are illustrated in FIG. 7. In general, as the gap size increases, the flow recirculation zones that existed in the case with no gaps diminish in size or are eliminated. The flow proceeds in essentially an uninterrupted fashion along the oxygen permeable membrane 36 for the cases with relatively large gaps. A periodic interruption of the boundary layers adjacent the oxygen permeable membrane 36 is important in order to increase mass transfer rates; relatively close spacing contact between the flow impingement elements 55 and oxygen permeable membrane 36 is preferred. Applicant has determined, however, that a gap smaller than 0.003 inches is acceptable. Furthermore, the base segment 60 preferably includes a radius to minimize the potential for damage to the relatively delicate oxygen permeable membrane 36 when assembled into the flow plate assembly 44.

The flow impingement elements 55 disclosed herein are preferably utilized for a deoxygenator system 14 having a fuel flow rate of approximately 209 pph at a fuel velocity of 0.36 ft/s per fuel channel 38. It should be understood that although the design flow rate is 1250 pounds of fuel per hour, the concept is of general application. Using this measure, a more efficiently performing FSU requires a smaller volume to process the same amount of fuel. A smaller volume FSU will thereby weigh less as well.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A liquid degassing system comprising:
   a gas receiving channel;
   a fluid channel;
   a gas permeable membrane in communication with said fluid channel and said gas receiving channel; and a multitude of flow impingement elements which extend into said fluid channel, each of said multitude of flow impingement elements include a stepped surface which faces into a fluid flow direction within said fluid channel, said stepped surface includes a radiused surface which blends a base segment having a first thickness adjacent said gas permeable membrane with a tip segment of a second thickness, said second thickness less than said first thickness, said base segment having a base wall surface perpendicular to said gas permeable membrane and said top segment having a tip wall surface perpendicular to said as permeable membrane.

2. The system as recited in claim 1, wherein said base segment is in contact with said gas permeable membrane.

3. The system as recited in claim 1, wherein said multitude of flow impingement elements each extend for a height greater than 0.5 H where H is a height of said fluid channel.

4. The system as recited in claim 1, wherein said multitude of flow impingement elements each extend for a height greater than 0.65 H where H is a height of said fluid channel.

5. The system as recited in claim 1, wherein each of said multitude of flow impingement elements define a generally stair step shape in cross-section.

6. The system as recited in claim 1, wherein said multitude of flow impingement elements includes a first multitude of flow impingement elements which extend from a first flow plate and a second multitude of flow impingement elements which extend from a second flow plate, said first flow plate mounted adjacent said second flow plate to define said fuel channel.

7. A fuel system comprising:
   a first flow plate which defines a first multitude of flow impingement elements; and
   a second flow plate which defines a second multitude of flow impingement elements, said first flow plate mounted adjacent said first flow plate to define a fuel channel, each of said first multitude of flow impingement elements and each of said second multitude of flow impingement elements extend for a height greater than 0.5 H where H is a height of said fuel channel, each of said multitude of flow impingement elements include a stepped surface which faces into a fluid flow direction within said fluid channel, said stepped surface includes a radiused surface which blends a base segment having a first thickness adjacent said gas permeable membrane with a tip segment of a second thickness, said second thickness less than said first thickness, said base segment having a base wall surface perpendicular to said gas permeable membrane and said top segment having a tip wall surface perpendicular to said gas permeable membrane.

8. The fuel system as recited in claim 7, further comprising a first oxygen permeable membrane mounted adjacent said first flow plate to define a first oxygen receiving channel opposite said fuel channel.

9. The fuel system as recited in claim 8, wherein said first multitude of flow impingement elements are in contact with said first oxygen permeable membrane.

10. The fuel system as recited in claim 8, further comprising a second oxygen permeable membrane mounted adjacent said second flow plate to define a second oxygen receiving channel opposite said fuel channel.

11. The fuel system as recited in claim 10, wherein said second multitude of flow impingement elements are in contact with said second oxygen permeable membrane.

12. The fuel system as recited in claim 10, wherein each of said first multitude of flow impingement elements and said second multitude of flow impingement elements direct a fuel flow toward said respective first oxygen permeable membrane and said second oxygen permeable membrane to provide a serpentine flow path.

13. The fuel system as recited in claim 12, wherein each of said first multitude of flow impingement elements are arranged in an interleaved arrangement with each of said second multitude of flow impingement elements.

14. The fuel system as recited in claim 7, wherein said first multitude of flow impingement elements are arranged on a first side of said fuel channel and said second multitude of flow impingement elements are arranged on a second side of said fuel channel opposite said first side, said first multitude of flow impingement elements and said second multitude of flow impingement elements arranged transverse to a fuel flow direction.

* * * * *